United States Patent
Koizumi et al.

(10) Patent No.: US 11,486,594 B2
(45) Date of Patent: Nov. 1, 2022

(54) AIR-CONDITIONING APPARATUS AND AIR-CONDITIONING SYSTEM

(71) Applicant: Mitsubishi Electric Corporation, Tokyo (JP)

(72) Inventors: Yoshiaki Koizumi, Tokyo (JP); Masafumi Tomita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 811 days.

(21) Appl. No.: 16/328,878

(22) PCT Filed: Nov. 18, 2016

(86) PCT No.: PCT/JP2016/084231
§ 371 (c)(1),
(2) Date: Feb. 27, 2019

(87) PCT Pub. No.: WO2018/092258
PCT Pub. Date: May 24, 2018

(65) Prior Publication Data
US 2020/0049363 A1 Feb. 13, 2020

(51) Int. Cl.
*F24F 11/38* (2018.01)
*F24F 11/52* (2018.01)
(Continued)

(52) U.S. Cl.
CPC .............. *F24F 11/38* (2018.01); *F24F 11/52* (2018.01); *F24F 11/56* (2018.01); *F24F 11/64* (2018.01);
(Continued)

(58) Field of Classification Search
CPC .. F24F 11/38; F24F 11/52; F24F 11/56; F24F 11/64; F24F 2110/10; F24F 2110/12;
(Continued)

(56) References Cited

U.S. PATENT DOCUMENTS 5,442,926 A * 8/1995 Kawai ................. F24F 11/30
62/211
10,794,608 B2 * 10/2020 Motodani ............. F24F 11/63
(Continued)

FOREIGN PATENT DOCUMENTS

JP            3897680 B2     3/2007
JP       2009-014233 A     1/2009

OTHER PUBLICATIONS

Extended European Search Report dated Jun. 18, 2018 issued in corresponding EP patent application No. 16904841.0.

*Primary Examiner* — Ramesh B Patel
(74) *Attorney, Agent, or Firm* — Posz Law Group, PLC (57) ABSTRACT

An air-conditioning apparatus includes an outdoor unit and an indoor unit that include devices and a pipe constituting a refrigerant circuit and a remote control connected to the indoor unit. Each of the outdoor unit and the indoor unit includes a sensor configured to detect temperature states of the devices and the pipe. The outdoor unit or the indoor unit includes a memory configured to hold sensor information indicating a result of the detection by the sensor and control information indicating control states of the devices. The remote control includes a microcomputer configured to receive information indicating states of sections based on the sensor information and the control information, output an estimated cause of trouble as output values, and compute a value corresponding to a possibility of being cause of trouble by using a neural network, and a display unit configured to display a result.

6 Claims, 4 Drawing Sheets

(51) Int. Cl.
*F24F 11/56* (2018.01)
*F24F 11/64* (2018.01)
*G05B 13/02* (2006.01)
*G06N 3/04* (2006.01)
*F24F 110/10* (2018.01)
*F24F 110/12* (2018.01)
*F24F 140/20* (2018.01)

(52) U.S. Cl.
CPC .............. *G05B 13/027* (2013.01); *G06N 3/04* (2013.01); *F24F 2110/10* (2018.01); *F24F 2110/12* (2018.01); *F24F 2140/20* (2018.01)

(58) Field of Classification Search
CPC ........ F24F 2140/20; F24F 11/58; F24F 11/62; G05B 13/027; G06N 3/04; G06N 3/084
See application file for complete search history.

(56) References Cited

U.S. PATENT DOCUMENTS

| | | | |
|---|---|---|---|
| 2012/0221150 A1* | 8/2012 | Arensmeier | F24F 11/30 702/183 |
| 2014/0262134 A1* | 9/2014 | Arensmeier | F24D 5/12 165/11.2 |
| 2015/0362207 A1* | 12/2015 | Abiprojo | F24F 11/62 702/183 |
| 2017/0075510 A1* | 3/2017 | Bentz | G06F 3/167 |
| 2017/0292725 A1* | 10/2017 | Conley | F24F 11/30 |
| 2019/0017721 A1* | 1/2019 | Motodani | F24F 11/64 |
| 2021/0287311 A1* | 9/2021 | Bentz | G06F 3/04886 |

\* cited by examiner

AIR-CONDITIONING APPARATUS AND AIR-CONDITIONING SYSTEM

CROSS REFERENCE TO RELATED APPLICATION

This application is a U.S. national stage application of International Application No. PCT/JP2016/084231, filed on Nov. 18, 2016, the contents of which are incorporated herein by reference.

TECHNICAL FIELD

The present invention relates to an air-conditioning apparatus and air-conditioning system that estimate a cause of trouble.

BACKGROUND

A remote control in a management system for a traditional air-conditioning apparatus is connected to an indoor unit with a transmission line disposed therebetween and retains data on a running history, trouble code, and other similar information received from the indoor unit. The remote control can transmit the retained data to a portable terminal, such as a cellular phone, of a user.

The remote control can further retain data on running information, such as the temperature setting of the air-conditioning apparatus, information indicating the type of the model of the apparatus, and the running time of the air-conditioning apparatus, the current consumption and rotation speed of a compressor in an outdoor unit, code indicating a cause of trouble, the ambient temperature, and other similar kinds of information. These various kinds of information can be sent from the portable terminal to a store that performs maintenance and other similar work, and service information relating to inspection can be identified in the store on the basis of received various kinds of information (for example, Patent Literature 1).

A water heating device that obtains data including detection signals of various sensors and instruction values during burner running or other similar operation for each preset time and that identifies the site of trouble on the basis of the obtained data is proposed (for example, Patent Literature 2). This water heating device holds the above-described data including detection signals of various sensors and instruction values as stored data, and if a malfunction occurs in the device, the device displays the latest data in the stored data before the occurrence of the malfunction in the device and the number corresponding to the malfunction in the device on a display section in a remote control. This allows a worker or other similar person in charge of repairing the water heating device to easily identify the site of trouble in the water heating device on the basis of the displayed content without using a dedicated measuring instrument or other similar equipment. Thus the time required for the repair work can be shortened or other similar advantageous effect can be achieved.

PATENT LITERATURE

Patent Literature 1: Japanese Unexamined Patent Application Publication No. 2009-14233
Patent Literature 2: Japanese Patent No. 3897680

In the invention described in Patent Literature 1, an obtained running history of a current value or other similar value of the compressor is compared with an average value in the same region, of the same model, and under the same condition. As a result of the comparison, if the difference between the running history and the average value exceeds a preset threshold, it is determined that there is some malfunction in the compressor or other component.

For example, if "an air conditioner does not cool", it is necessary to observe the running state of the compressor or refrigerant circuit. Thus determination using thresholds simply on individual components is insufficient for identifying the cause of trouble. In addition, because the cause of trouble is influenced by variations depending on setting conditions and variations depending on models, fixed displaying of trouble codes does not lead to accurate estimation of the cause of trouble.

In the invention described in Patent Literature 2, because the worker identifies the site of trouble on the basis of information displayed on the display section, correct identification of the cause of trouble heavily depends on the skill and experience of the worker. That is, it is difficult to accurately estimate the site of trouble in the invention described in Patent Literature 2.

SUMMARY

In view of the above-described problems, it is an object of the present invention to provide an air-conditioning apparatus and an air-conditioning system capable of accurately estimating a cause of trouble and improving the accuracy of detection of the place of a malfunction.

An air-conditioning apparatus according to an embodiment of the present invention includes an outdoor unit and an indoor unit that include devices and a pipe constituting a refrigerant circuit; and a remote control connected to the indoor unit, wherein each of the outdoor unit and the indoor unit includes a sensor configured to detect temperature states of the devices and the pipe, the outdoor unit or the indoor unit includes a memory configured to hold sensor information indicating a result of the detection by the sensor and control information indicating control states of the devices, and the remote control includes a neural network computation unit configured to receive information indicating states of sections based on the sensor information and the control information at an identical time obtained from the memory as input values for a neural network, output estimated causes of trouble as output values for the neural network, and compute a value corresponding to a possibility of being cause of trouble for each of the causes of trouble by using a neural network, and a display unit configured to display a result of the computation by the neural network computation unit.

As described above, according to an embodiment of the present invention, the cause of trouble is estimated by using the neural network. Thus the cause of trouble can be estimated accurately, and the accuracy of detection of the place of a malfunction can be improved.

DETAILED DESCRIPTION

Embodiment 1

An air-conditioning apparatus according to Embodiment 1 is described below.

[Configuration of Air-Conditioning Apparatus]

Figure 1:
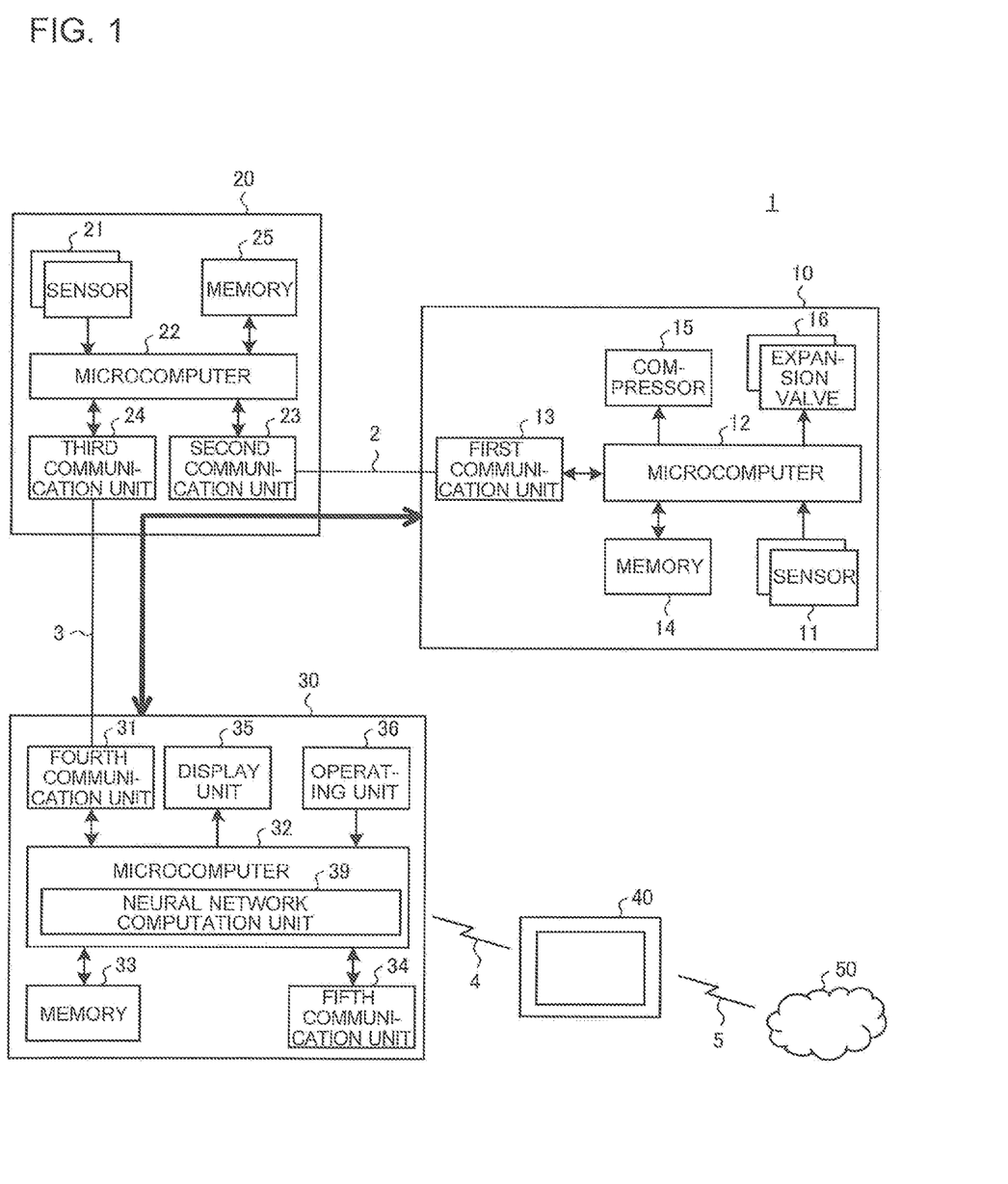
FIG. 1 is a block diagram that illustrates an example of a configuration of an air-conditioning apparatus according to Embodiment 1.

FIG. 1 is a block diagram that illustrates an example of a configuration of an air-conditioning apparatus 1 according to Embodiment 1.

As illustrated in FIG. 1, the air-conditioning apparatus 1 includes an outdoor unit 10, an indoor unit 20, and a remote control (hereinafter sometimes referred to as "remote") 30. The outdoor unit 10 and indoor unit 20 are connected to each other with a first connection line 2 in a wired or wireless manner using a first communication mode. The indoor unit 20 and remote 30 are connected to each other with a second connection line 3 in a wired or wireless manner using a second communication mode.

The remote 30 is connected to an information terminal 40 with a third connection line 4 in a wireless manner using a third communication mode. One example of the third communication mode may be near field communication using Bluetooth (registered trademark) Low Energy (BLE) technology. The remote 30 can also be connected to a device other than the information terminal 40, for example, to a general-purpose device, such as a temperature-humidity sensor (not illustrated) placed inside an air-conditioned space, using the third communication mode.

The information terminal 40 can provide a user with information about the air-conditioning apparatus 1, such as control states of sections in the air-conditioning apparatus 1. Examples of the information terminal 40 may include portable terminals, such as a smartphone, a tablet terminal, and a notebook personal computer (PC). The information terminal 40 is not limited to these examples, and it may be a fixed terminal, such as a desktop PC.

In the air-conditioning apparatus 1, devices and a pipe constituting a refrigerant circuit, such as a compressor and a heat exchanger, are disposed in the outdoor unit 10 or indoor unit 20. In FIG. 1, only the portion relating to the characteristics of Embodiment 1 is illustrated, and the other portion is not illustrated or described. The present invention is not limited to this example, in which the air-conditioning apparatus 1 includes one outdoor unit 10 and one indoor unit 20. The air-conditioning apparatus 1 may include a plurality of outdoor units 10 or indoor units 20 or may include pluralities of outdoor units 10 and indoor units 20. That is, the numbers of outdoor units 10 and indoor units 20 can be set at any numbers according to the circumstances where the air-conditioning apparatus 1 is installed.

(Outdoor Unit)

The outdoor unit 10 includes one or more sensors 11, a microcomputer (hereinafter sometimes referred to as "micro") 12, a first communication unit 13, a memory 14, and a compressor 15 and an expansion valve 16 as devices constituting the refrigerant circuit.

The sensors 11 are disposed in sections of the outdoor unit 10 and configured to detect states of measurement targets. Specifically, examples of the sensors 11 may be temperature sensors configured to detect states of temperatures of sections, such as an ambient temperature, a temperature of the compressor 15, and a temperature of a pipe. Information on the detected temperatures or other similar information is supplied to the microcomputer 12 as sensor information about the outdoor unit 10 (hereinafter sometimes referred to as "outdoor-unit sensor information"). The sensors 11 are not limited to the temperature sensors. For example, pressures or other quantities of sections may be detected by using pressure sensors or other similar sensors.

The microcomputer 12 controls the overall outdoor unit 10, for example, performs operational control of the devices constituting the refrigerant circuit, such as the compressor 15 and expansion valve 16. For example, the microcomputer 12 provides an instruction as to the compressor frequency of the compressor 15 and the opening degree of the expansion valve 16.

The microcomputer 12 sets and changes the state of the outdoor unit 10 on the basis of control instruction information received from the remote 30 through the indoor unit 20. In addition, the microcomputer 12 obtains the outdoor-unit sensor information detected by the sensors 11 and the control information indicating the control state of a device in the outdoor unit 10, such as the compressor frequency of the compressor 15, controls writing into the memory 14, which is described below, and controls communications of the first communication unit 13, which is described below. The details of the control instruction information are described below.

The first communication unit 13 controls communications with the indoor unit 20 using the first communication mode on the basis of a command from the microcomputer 12. For example, the first communication unit 13 receives sensor information about the indoor unit 20 supplied from the indoor unit 20 (hereinafter sometimes referred to as "indoor-unit sensor information") and supplies the received indoor-unit sensor information to the microcomputer 12.

The first communication unit 13 receives the control instruction information from the remote 30 through the indoor unit 20 and supplies the received control instruction information to the microcomputer 12. In addition, the first communication unit 13 receives the outdoor-unit sensor information, indoor-unit sensor information, and control information retained in the memory 14, which is described below, from the microcomputer 12 and transmits them to the indoor unit 20. In the description below, the "outdoor-unit sensor information and indoor-unit sensor information" are sometimes collectively referred to as "sensor information".

The memory 14 is a data retaining unit configured to retain various kinds of data. The memory 14 writes and reads the outdoor-unit sensor information detected by the sensors 11 under the control of the microcomputer 12. The memory 14 writes and reads the indoor-unit sensor information, such as a suction temperature and a temperature of a pipe in the indoor unit 20, obtained through the first communication unit 13 under the control of the microcomputer 12.

(Indoor Unit)

The indoor unit 20 includes one or more sensors 21, a microcomputer 22, a second communication unit 23, a third communication unit 24, and a memory 25.

The sensors 21 are disposed in sections of the indoor unit 20 and configured to detect states of measurement targets. Specifically, examples of the sensors 21 may be temperature sensors configured to detect states of temperatures of sections, such as a suction temperature of the air in an air-conditioned space and a temperature of a pipe. Information on the detected temperatures or other similar information is supplied to the microcomputer 22 as indoor-unit sensor information. The sensors 21 are not limited to the temperature sensors. For example, pressures or other quantities of sections may be detected by using pressure sensors or other similar sensors.

The microcomputer 22 controls the overall indoor unit 20, for example, performs operational control of the devices constituting the refrigerant circuit. For example, the microcomputer 22 sets and changes the state of the indoor unit 20 on the basis of control instruction information received from the remote 30, which is described below, and transfers the received control instruction information to the outdoor unit 10 as needed. The microcomputer 22 obtains the indoor-unit sensor information indicating the states of sections and detected by the sensors 21, such as a suction temperature and a temperature of a pipe, controls writing into the memory 25, which is described below, and controls communications of the second communication unit 23 and third communication unit 24, which are described below.

The second communication unit 23 controls communications with the outdoor unit 10 using the first communication mode on the basis of a command from the microcomputer 22. For example, the second communication unit 23 receives the indoor-unit sensor information detected by the sensors 21 and the control instruction information transmitted from the remote 30 from the microcomputer 22 and transmits them to the outdoor unit 10. The second communication unit 23 receives the sensor information and control information from the outdoor unit 10 and supplies the received information to the microcomputer 22.

The third communication unit 24 controls communications with the remote 30 using the second communication mode on the basis of a command from the microcomputer 22. For example, the third communication unit 24 receives the control instruction information from the remote 30 and supplies the received control instruction information to the microcomputer 22. The third communication unit 24 receives the sensor information and control information from the microcomputer 22 and transmits them to the remote 30.

The memory 25 is a data retaining unit configured to retain various kinds of data. The memory 25 writes and reads the indoor-unit sensor information detected by the sensors 21 under the control of the microcomputer 22.

(Remote Control)

The remote 30 includes a fourth communication unit 31, a microcomputer 32, a memory 33, a fifth communication unit 34, a display unit 35, and an operating unit 36.

The fourth communication unit 31 controls communications with the indoor unit 20 using the second communication mode on the basis of a command from the microcomputer 32. For example, the fourth communication unit 31 transmits the control instruction information for controlling the operation of the outdoor unit 10 and indoor unit 20 received from the microcomputer 32 to the indoor unit 20. The fourth communication unit 31 receives the sensor information and control information from the indoor unit 20 and supplies them to the microcomputer 32.

The microcomputer 32 controls the overall remote 30 on the basis of operating on the operating unit 36, which is described below, by a user. For example, the microcomputer 32 generates the control instruction information for controlling the operation of the outdoor unit 10 and indoor unit 20 on the basis of an operating signal obtained by operating by the user.

The microcomputer 32 includes a neural network computation unit 39. The neural network computation unit 39 stochastically estimates the state of the air-conditioning apparatus 1 by using a neural network. Specifically, the neural network computation unit 39 determines whether the air-conditioning apparatus 1 is in normal operation or there is a possibility that some failure occurs on the basis of various information obtained through the indoor unit 20. The microcomputer 32 supplies determination information indicating the result of the determination by the neural network computation unit 39 to the memory 33. The details of the computation processing by the neural network computation unit 39 are described below.

The memory 33 is a data retaining unit configured to retain various kinds of data. The memory 33 writes and reads the determination information indicating the result of determination by the neural network computation unit 39 under the control of the microcomputer 32.

The fifth communication unit 34 controls communications with the information terminal 40 using the third communication mode on the basis of a command from the microcomputer 32. For example, the fifth communication unit 34 transmits the determination information read from the memory 33 under the control of the microcomputer 32 to the information terminal 40. The information terminal 40 transmits the determination information received from the remote 30 to a cloud 50 connected thereto over a network 5, such as the Internet, and causes it to be held on the cloud 50.

The display unit 35 may comprise, for example, a liquid crystal display (LCD), or an organic electroluminescent display (OELD), or other type of display. The display unit 35 displays the result of determination based on the determination information. The display unit 35 may be a device that not only simply displays the result of determination. For example, as the display unit 35, a touch panel display in which a touch panel including a touch sensor is stacked on the LCD or OELD may be used.

The operating unit 36 includes various buttons or keys or other similar elements for use in operating the air-conditioning apparatus 1 and outputs an operating signal corresponding to operating on each button or key or another element. As described above, when the display unit 35 is a touch panel display, various buttons or keys may be displayed on the display unit 35 as software buttons or software keys.

[Neural Network Computation Processing]

Next, the neural network computation processing performed by the neural network computation unit 39 is described. As described above, the neural network computation unit 39 stochastically estimates the state of the air-conditioning apparatus 1 by using the neural network. Such determination of the state of the air-conditioning apparatus 1 is conducted when, for example, a malfunction is detected while the air-conditioning apparatus 1 is in operation.

Figure 2:
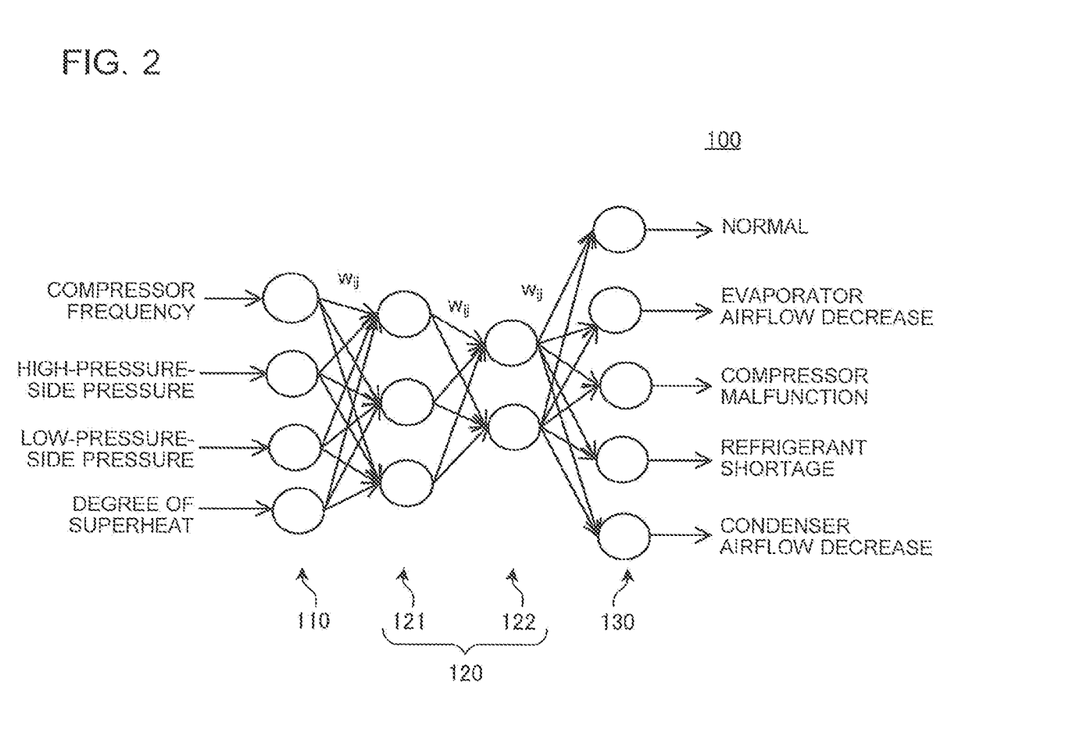
FIG. 2 is a schematic diagram for describing neural network computation processing performed by a neural network computation unit illustrated in FIG. 1.

FIG. 2 is a schematic diagram for describing the neural network computation processing performed by the neural network computation unit 39 illustrated in FIG. 1. As illustrated in FIG. 2, a neural network 100 used in Embodiment 1 is a hierarchical network including an input layer 110, a hidden layer 120, and an output layer 130, each of which includes a plurality of units. In this example, the hidden layer 120 is composed of two layers of a first hidden layer 121 and a second hidden layer 122.

The input layer 110 is configured to transmit a signal based on input information to the hidden layer 120. Each of the units constituting the input layer 110 is linked to all units constituting the first hidden layer 121, which is the next layer. The hidden layer 120 is configured to perform computation processing based on the signal input from the preceding layer and output the result of the computation. Each of the units constituting the hidden layer 120 is linked to all units constituting the next layer. The output layer 130 is configured to perform computation processing based on the signal input from the preceding second hidden layer 122 and output the result of the computation as an output signal.

In the neural network 100 according to Embodiment 1, information indicating the state of the air-conditioning apparatus 1 is input into the input layer 110 as an input signal. Specifically, for example, "compressor frequency", "high-pressure-side pressure", "low-pressure-side pressure", and "degree of superheat" at an identical time are input into the input layer 110 as input signals. These input signals can be obtained on the basis of sensor information and control information retained in the memory 14 in the outdoor unit 10.

A cause of trouble in the air-conditioning apparatus 1 is output from the output layer 130 as an output signal. Specifically, for example, "normal", "evaporator airflow decrease", "compressor malfunction", "refrigerant shortage", and "condenser airflow decrease" as estimated causes of trouble are output from the output layer 130 as output signals.

In the neural network 100, in transmission of each of the signals from a layer to the next layer, associated weight $w_{ij}$ is multiplied to a signal being transmitted. The weight $w_{ij}$ is set in advance for the neural network computation processing and reflects the content of learning in the neural network 100. The subscript "i" in the weight $w_{ij}$ denotes the number of a unit in the layer at the starting point in the network, and the subscript "j" denotes the number of a unit in the layer at the endpoint in the network. The weight $w_{ij}$ is held in the memory 33 in the remote 30 in a weighting table. The details of the weight $w_{ij}$ are described below.

Next, the process of the neural network computation processing using the neural network 100 is described with reference to FIG. 2. First, in the neural network 100 illustrated in FIG. 2, information items indicating "compressor frequency", "high-pressure-side pressure", "low-pressure-side pressure", and "degree of superheat", respectively, are input into the respective units in the input layer 110 as input signals. The units in the input layer 110 transmit the received input signals to each of the units in the first hidden layer 121. That is, all of the input signals input in the input layer 110 are input into each of the units in the first hidden layer 121.

Next, each of the units in the first hidden layer 121 adds the input signal received from each of the units in the input layer 110 and the weight $w_{ij}$ associated with the input signal and generates a signal in which all the signals obtained by the additions are summed. Then, each of the units in the first hidden layer 121 transmits a first hidden layer signal based on the generated signal to each of the units in the second hidden layer 122.

Each of the units in the second hidden layer 122 adds the first hidden layer signal received from each of the units in the first hidden layer 121 and the weight $w_{ij}$ associated with the signal and generates a signal in which all the signals obtained by the additions are summed. Then, each of the units in the second hidden layer 122 transmits a second hidden layer signal based on the generated signal to each of the units in the output layer 130.

Each of the units in the output layer 130 adds the second hidden layer signal received from each of the units in the second hidden layer 122 and the weight $w_{ij}$ associated with the signal and generates a signal in which all the signals obtained by the additions are summed. Then, each of the units in the output layer 130 outputs an output signal based on the generated signal. At this time, the sum total of values of the output signals output from the output layer 130 is "1".

In this way, the neural network computation unit 39 obtains the output signals on the basis of input signals based on the sensor information and control information and on the basis of the weights $w_{ij}$ obtained by referring to the weighting table held in the memory 33.

Figure 3:
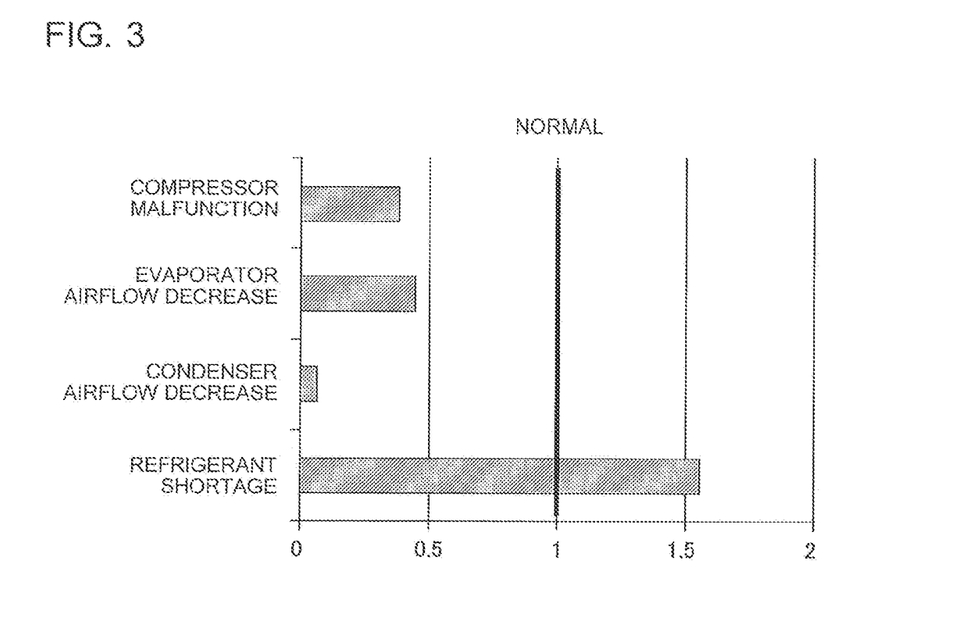
FIG. 3 is a schematic diagram for describing a result of the neural network computation processing.

FIG. 3 is a schematic diagram for describing a result of the neural network computation processing. FIG. 3 is a graph that illustrates magnitudes of possibilities at which malfunctions are caused when, for example, the malfunction is detected while the air-conditioning apparatus 1 is in operation. In this example, normalized values of the values of output signals corresponding to the causes of trouble are illustrated with reference to a value indicating "normal". That is, this graph indicates that there is a possibility that a cause of trouble corresponding to an output signal whose value is larger than "1", which is the value indicating "normal", is the cause of the malfunction. Accordingly, in the example illustrated in FIG. 3, "refrigerant shortage" has the highest possibility of being the cause of trouble when the malfunction is detected. Such a graph indicating the result of determination of the cause of trouble is displayed on, for example, the display unit 35 in the remote 30. This can enable a worker to easily estimate the cause of trouble during maintenance or other work, and can result in improved maintainability.

(Changing of Weight)

In Embodiment 1, the weight $w_{ij}$ included in the weighting table can be changed to an optimal one by using feedback indicating that the result of computation obtained as described above is correct or not. Here, "the result of computation is correct" indicates the case where the cause of a malfunction is the cause with the highest possibility of being the cause of trouble obtained by the neural network computation processing.

In this case, the weight $w_{ij}$ can be updated by calculation using, for example, backpropagation. Because the backpropagation is a method typically used in calculating the weight in the neural network 100, it is not described here.

Recalculation of the weight $w_{ij}$ using backpropagation or other methods can be performed in, for example, an external PC or other device connected to the network 5. For example, when a worker inputs feedback as to the result of computation by operating the operating unit 36, the remote 30 transmits feedback information indicating the input feedback to the external PC. The PC recalculates the weight $w_{ij}$ on the basis of the feedback information, sensor information, and control information by using the backpropagation.

The remote 30 receives the recalculated weight $w_{ij}$ from the external PC over the network 5, information terminal 40, and fifth communication unit 34. The microcomputer 32 in the remote 30 updates the weighting table by storing the received weight $w_{ij}$ in the weighting table held in the memory 33.

As described above, the air-conditioning apparatus 1 according to Embodiment 1 includes the outdoor unit 10 and indoor unit 20 including the devices and pipe constituting the refrigerant circuit and the remote 30 connected to the indoor unit 20, the outdoor unit 10 and indoor unit 20 include the sensors 11 and sensors 21, respectively, for detecting the temperature states of the devices and pipe, and the outdoor unit 10 or indoor unit 20 includes the memory 14 or 25 configured to hold sensor information indicating the result of detection by the sensors 11 and sensors 21 and control information indicating the control states of the devices. The remote 30 includes the neural network computation unit 39 configured to use information indicating the states of the sections based on the sensor information and control information at an identical time obtained from the memory 14 or 25 as input values, use estimated causes of trouble as output values, and compute values corresponding to the possibilities of the causes of trouble by using the neural network 100 and the display unit 35 configured to display a result of the computation by the neural network computation unit 39.

As described above, in Embodiment 1, because the cause of trouble is stochastically estimated by using the neural network 100, the cause of trouble can be accurately estimated, and the accuracy of detection of the place of a malfunction can be improved.

Because the value of the weight $w_{ij}$ used in the computation processing by the neural network 100 is recalculated and weight update is performed on the basis of feedback information indicating that the estimated cause of trouble is correct or not, the sensor information, and the control information, the accuracy of estimation of the cause of trouble can be further improved. In addition, when the above-described recalculation of the value of the weight $w_{ij}$ is performed by an external PC or other similar device, a low-performance microcomputer can be used as the microcomputer 32 in the remote 30, and therefore, the cost can be reduced.

Embodiment 2

Next, an air-conditioning apparatus according to Embodiment 2 is described. The air-conditioning apparatus according to Embodiment 2 differs from Embodiment 1 described above in that the neural network computation unit is included in the information terminal 40.

Figure 4:
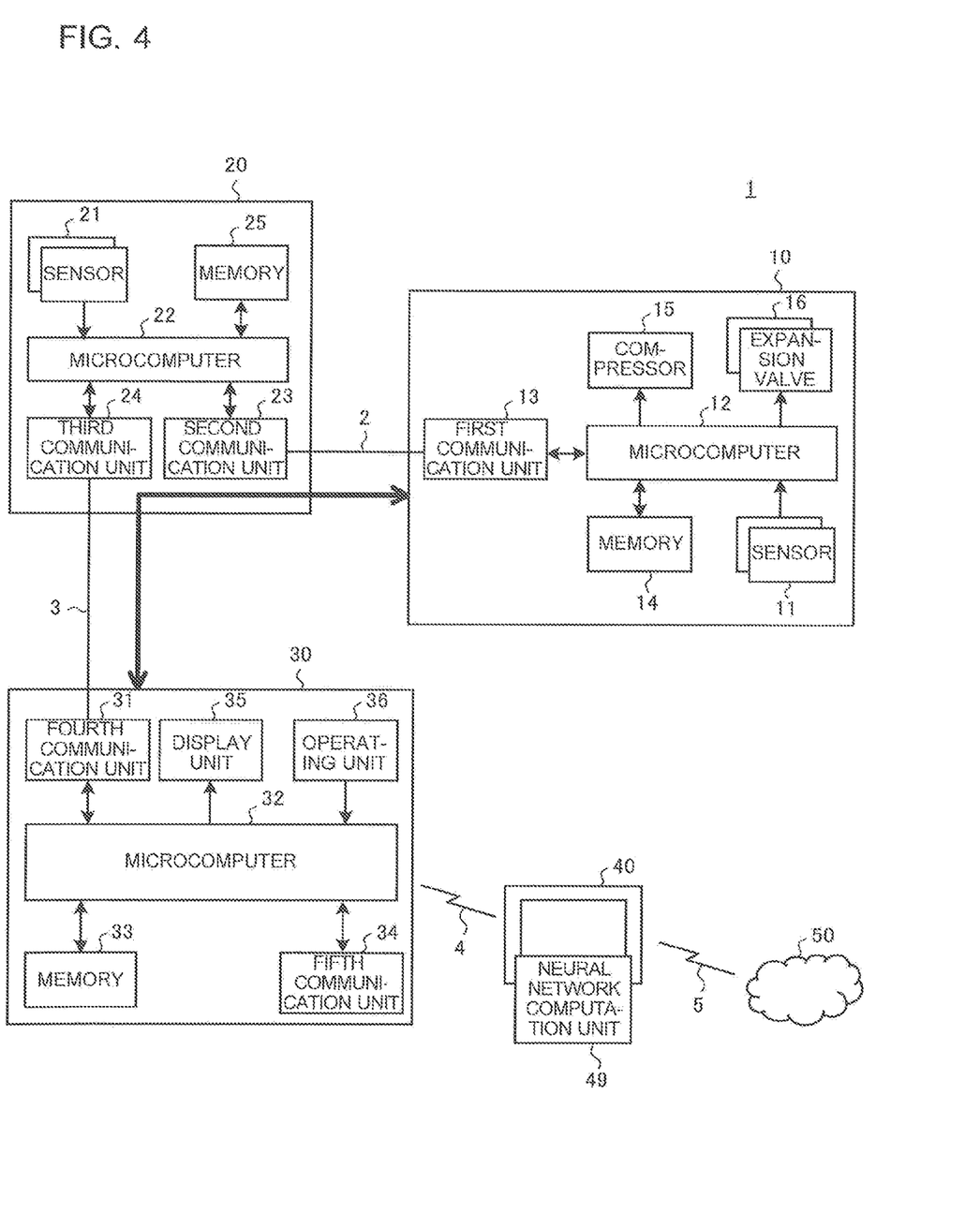
FIG. 4 is a block diagram that illustrates an example of a configuration of an air-conditioning apparatus according to Embodiment 2.

FIG. 4 is a block diagram that illustrates an example of a configuration of the air-conditioning apparatus 1 according to Embodiment 2. As illustrated in FIG. 4, the air-conditioning apparatus 1 according to Embodiment 2 includes a neural network computation unit 49 in the information terminal 40. In the description below, the same reference numerals are used in portions common to those in Embodiment 1 described above, and the description thereof is omitted.

The microcomputer 32 in the remote 30 receives the sensor information and control information transmitted from the outdoor unit 10 through the fourth communication unit 31 and supplies them to the fifth communication unit 34. The fifth communication unit 34 performs substantially the same communication processing as in Embodiment 1 and transmits the sensor information and control information received from the microcomputer 32 to the information terminal 40.

The information terminal 40 performs the neural network computation processing on the basis of the sensor information and control information received from the remote 30. The computation processing performed in the neural network computation unit 49 is substantially the same as that in the neural network computation unit 39 in Embodiment 1.

When the neural network computation processing is performed by the information terminal 40, the remote 30 receives the information indicating the possibility of being the cause of trouble as the result of the computation from the information terminal 40 through the fifth communication unit 34. The microcomputer 32 causes the display unit 35 to display the information indicating the possibility of being the cause of trouble received from the information terminal 40.

At this time, the weighting table used in the neural network computation processing may be possessed in, for example, an application in the information terminal 40, and as in the case of Embodiment 1, the weight $w_{ij}$ can be updated by using feedback indicating that the result of computation obtained by the computation processing is correct or not. Accordingly, when the feedback information from the remote 30 is transmitted to the external PC and the PC recalculates the weight $w_{ij}$, the information terminal 40 obtains the weight $w_{ij}$ from the PC and updates the weighting table, as in the case of Embodiment 1.

The information terminal 40 can obtain the updated weight $w_{ij}$ by, for example, manual inputting to the information terminal 40 by a user, reading of quick response code (QR code (registered trademark)), or employing an input-output interface, such as connection through universal serial bus (USB) or network connection.

As described above, Embodiment 2 can achieve substantially the same advantages as in Embodiment 1. By performing the neural network computation processing in the information terminal 40 in place of the remote 30, the load on the microcomputer 32 in the remote 30 can be lightened.

Embodiment 3

Next, an air-conditioning apparatus according to Embodiment 3 is described. The air-conditioning apparatus according to Embodiment 3 differs from Embodiments 1 and 2 described above in that the neural network computation unit is included in the cloud 50.

Figure 5:
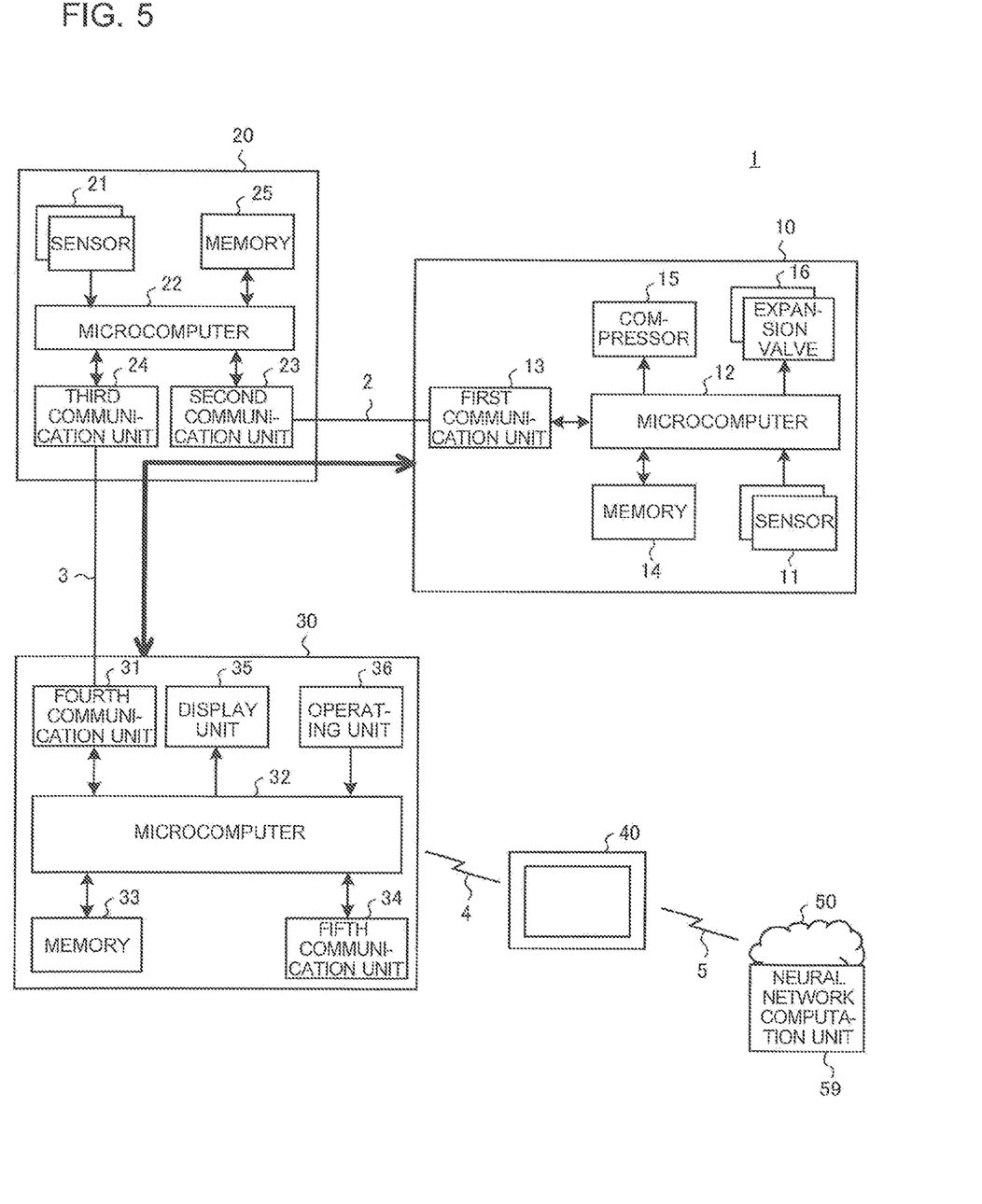
FIG. 5 is a block diagram that illustrates an example of a configuration of an air-conditioning apparatus according to Embodiment 3.

FIG. 5 is a block diagram that illustrates an example of a configuration of the air-conditioning apparatus according to Embodiment 3. As illustrated in FIG. 5, the air-conditioning apparatus 1 according to Embodiment 3 includes a neural network computation unit 59 in the cloud 50. In the description below, the same reference numerals are used in portions common to those in Embodiments 1 and 2 described above, and the description thereof is omitted.

The microcomputer 32 in the remote 30 receives the sensor information and control information transmitted from the outdoor unit 10 through the fourth communication unit 31 and supplies them to the fifth communication unit 34. The fifth communication unit 34 performs substantially the same communication processing as in Embodiment 1 and transmits the sensor information and control information received from the microcomputer 32 to the information terminal 40.

The information terminal 40 transmits the sensor information and control information received from the remote 30 to the cloud 50 over the network 5. The cloud 50 performs the neural network computation processing on the basis of the sensor information and control information received from the information terminal 40. The computation processing performed in the neural network computation unit 59 is substantially the same as that in the neural network computation unit 39 in Embodiment 1 and that in the neural network computation unit 49 in Embodiment 2.

When the neural network computation processing is performed in the cloud 50, the remote 30 receives the information indicating the possibility of being the cause of trouble as the result of the computation from the cloud 50 through the information terminal 40 and fifth communication unit 34. The microcomputer 32 causes the display unit 35 to display the information indicating the possibility of being the cause of trouble received from the cloud 50.

At this time, the weighting table used in the neural network computation processing may be possessed in, for example, an application in the cloud 50, and as in the case of Embodiments 1 and 2, the weight $w_{ij}$ can be updated by using feedback indicating that the result of computation obtained by the computation processing is correct or not. Accordingly, when the feedback information from the remote 30 is transmitted to the external PC and the PC recalculates the weight $w_{ij}$, the cloud 50 obtains the weight $w_{ij}$ from the PC and updates the weighting table, as in the case of Embodiments 1 and 2.

As described above, the air-conditioning apparatus according to Embodiment 3 can achieve substantially the same advantages as in Embodiment 1. By performing the neural network computation processing in the cloud 50 in place of the remote 30, the load on the microcomputer 32 in the remote 30 can be lightened.

Embodiments 1 to 3 are described above. The present invention is not limited to Embodiments 1 to 3 described above, and various modifications and applications can be made without departing from the scope of the present invention. For example, the present invention is not limited to the above-described examples, in which both the outdoor-unit sensor information and indoor-unit sensor information are held in the memory 14 in the outdoor unit 10. Both the outdoor-unit sensor information and indoor-unit sensor information may be held in the memory 25 in the indoor unit 20.

The present invention is not limited to the above-described examples, in which the number of layers in the hidden layer 120 is two. For example, the number of layers in the hidden layer 120 may be one or more. The number of layers in the hidden layer 120 may be set at any number in consideration of the accuracy of determination of the state of the air-conditioning apparatus 1 or other factor.

The input signal in the neural network computation processing is not limited to that in the above-described examples. For example, a signal indicating information on the discharge temperature of the compressor 15, evaporating temperature of the heat exchanger, ambient temperature, temperature setting, or opening degree of the expansion valve 16, or other quantities may be used as the input signal. The input signal into the input layer 110 may be based on a plurality of information items obtained at preset time intervals, such as 1-minute intervals.

The present invention is not limited to the above-described examples, in which the cause of trouble is estimated when a malfunction of the air-conditioning apparatus 1 is detected. For example, the cause of trouble can be estimated in a similar way when the air-conditioning apparatus 1 is installed or is in maintenance.

The invention claimed is:

1. An air-conditioning apparatus comprising:
an outdoor unit constituting an outdoor refrigerant circuit including outdoor components connected by at least one outdoor pipe, the outdoor components comprising at least an outdoor compressor and an outdoor heat exchanger;
an indoor unit constituting an indoor refrigerant circuit including indoor components connected by at least one indoor pipe, the indoor components comprising at least an indoor compressor and an indoor heat exchanger; and
a remote control wirelessly connected to the indoor unit, wherein
the outdoor unit includes a first sensor configured to detect first temperature states of the outdoor components and the at least one outdoor pipe,
the indoor unit includes a second sensor configured to detect second temperature states of the indoor components and the at least one indoor pipe,
the outdoor unit or the indoor unit includes a memory configured to hold
sensor information indicating a result of the detection by the first sensor or the second sensor, and
control information indicating control states of the first components or the second components, and
the remote control includes
a microcomputer configured to
receive, at an identical time, as input values for a neural network, input information indicating states of sections of the outdoor unit or indoor unit based on the sensor information and the control information obtained from the memory,
output estimated causes of trouble as output values for the neural network, and
for each output value that is an estimated cause of trouble, compute a value corresponding to a possibility of a respective estimated cause of trouble being an actual cause of trouble, and
a display unit configured to display a result of the computation by the microcomputer.

2. The air-conditioning apparatus of claim 1, wherein the neural network includes
an input layer configured to receive the input values,
a hidden layer linked to the input layer, and
an output layer linked to the hidden layer,
a value of a weight assigned between the linked layers is externally calculated, and
the microcomputer is configured to obtain the externally calculated value of the weight and perform a weight update.

3. The air-conditioning apparatus of claim 2, wherein the value of the weight is calculated based on information indicating that the cause of trouble is correct or not, the sensor information, and the control information.

4. The air-conditioning apparatus of claim 1, wherein the display unit is configured to display a graph illustrating the possibility of each respective causes of trouble being the actual cause of trouble with reference to a normal state.

5. An air-conditioning system comprising:
an air-conditioning apparatus including:
an outdoor unit constituting an outdoor refrigerant circuit including outdoor components connected by at least one outdoor pipe, the outdoor components comprising at least an outdoor compressor and an outdoor heat exchanger,
an indoor unit constituting an indoor refrigerant circuit including indoor components connected by at least one indoor pipe, the indoor components comprising at least an indoor compressor and an indoor heat exchanger, and
a remote control wirelessly connected to the indoor unit,
the outdoor unit including a first sensor configured to detect first temperature states of the outdoor components and the at least one outdoor pipe,
the indoor unit including a second sensor configured to detect second temperature states of the indoor components and the at least one indoor pipe,
the outdoor unit or the indoor unit including a memory configured to hold
sensor information indicating a result of the detection by the first sensor or the second sensor, and control information indicating control states of the first components or the second components, and the remote control including a microcomputer configured to receive, at an identical time, as input values for a neural network, input information indicating states of sections of the outdoor unit or indoor unit based on the sensor information and the control information obtained from the memory, output estimated causes of trouble as output values for the neural network, and for each output value that is an estimated cause of trouble, compute a value corresponding to a possibility of a respective estimated cause of trouble being an actual cause of trouble, and a display unit configured to display a result of the computation by the microcomputer; and an information terminal configured to provide information about the air-conditioning apparatus, wherein the microcomputer is included in the information terminal in place of the remote control.

6. The air-conditioning system of claim 5, wherein the information terminal is connected to a cloud over a network, and the microcomputer is included in the cloud in place of the information terminal.

* * * * *